(12) United States Patent
Shabadi et al.

(10) Patent No.: US 10,847,039 B1
(45) Date of Patent: Nov. 24, 2020

(54) SYSTEM AND METHOD TO COMPUTE OPTIMUM CRUISE LEVEL BY CONSIDERING ATMOSPHERIC CONDITIONS

(71) Applicant: HONEYWELL INTERNATIONAL INC., Morris Plains, NJ (US)

(72) Inventors: Ganesh Shabadi, Bangalore (IN); Sivakumar Kanagarajan, Madurai (IN); Jim Rumbo, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 16/513,302

(22) Filed: Jul. 16, 2019

(51) Int. Cl.
*G08G 5/00* (2006.01)

(52) U.S. Cl.
CPC .................................. *G08G 5/0039* (2013.01)

(58) Field of Classification Search
None
See application file for complete search history.

(56) References Cited

U.S. PATENT DOCUMENTS

| | | | | |
|---|---|---|---|---|
| 3,719,337 A * | 3/1973 | Gardner | G05D 1/046 | 244/177 |
| 3,781,530 A * | 12/1973 | Britland | G01S 13/953 | 701/301 |
| 5,615,118 A * | 3/1997 | Frank | G01C 21/16 | 701/4 |
| 5,797,106 A * | 8/1998 | Murray | G01C 23/005 | 701/11 |
| 6,381,538 B1 * | 4/2002 | Robinson | G01C 23/00 | 701/439 |
| 8,645,009 B2 | 2/2014 | Klooster | | |
| 2002/0171563 A1 * | 11/2002 | Djorup | G01P 5/12 | 340/968 |
| 2006/0155432 A1 | 7/2006 | Brown | | |
| 2009/0143988 A1 * | 6/2009 | Tillotson | G01P 5/26 | 702/3 |
| 2013/0226373 A1 | 8/2013 | Bollapragada et al. | | |
| 2015/0153177 A1 * | 6/2015 | Bailey | G08G 5/0013 | 701/400 |
| 2016/0232797 A1 | 8/2016 | Wiesmann et al. | | |
| 2017/0249849 A1 | 8/2017 | De Prins et al. | | |

OTHER PUBLICATIONS

Imen Dhief. Optimization of aircraft trajectories over the North Atlantic Airspace. Optimization and Control [math.OC]. Université Paul Sabatier (Toulouse 3), 2018. English. <tel-01912385> HAL Id: tel-01912385 https://tel.archives-ouvertes.fr/tel-01912385, Submitted on Nov. 5, 2018.

* cited by examiner

*Primary Examiner* — Emily C Terrell
(74) *Attorney, Agent, or Firm* — Lorenz & Kopf, LLP

(57) ABSTRACT

A computer-implemented method in an aircraft for identifying a flight plan modification that has a favorable impact from jet streams is provided. The method includes: retrieving an entered flight plan for the aircraft; retrieving available jet stream data identifying one or more jet streams in proximity to a proposed flight path from the entered flight plan, wherein the jet stream data includes jet stream vector, altitude, width, and thickness data; projecting the jet stream data around the proposed flight path as points of interest around the proposed flight path; identifying a flight plan modification that has the most favorable impact from jet streams at the points of interest; and displaying the identified flight plan modification on a user interface.

20 Claims, 8 Drawing Sheets

SYSTEM AND METHOD TO COMPUTE OPTIMUM CRUISE LEVEL BY CONSIDERING ATMOSPHERIC CONDITIONS

TECHNICAL FIELD

Embodiments of the subject matter described herein relate generally to systems for adjusting a flight plan based on atmospheric conditions. More particularly, embodiments of the subject matter relate to adjusting a flight plan based on jet stream data.

BACKGROUND

Jet streams are fast flowing, narrow air currents found in the upper atmosphere between 30,000 ft to 50,000 ft. Jet streams can positively or negatively impact aircraft travel. Favorable jet streams can increase an aircraft's airspeed and/or decrease fuel usage. Unfavorable jet streams can pose serious threats to flight safety, require aircraft to carry and consume more fuel, which increases the gross weight of the aircraft and reduces the number of passengers and/or cargo weight that can be carried. Unfavorable jet streams can also delay the ETA (estimated time of arrival) at a destination airport.

Hence, it is desirable for a system that can identify favorable jet streams for an entered flight plan and suggest favorable flight plan changes that can improve fuel economy and/or aircraft performance. Furthermore, other desirable features and characteristics of the present invention will become apparent from the subsequent detailed description and the appended claims, taken in conjunction with the accompanying drawings and the foregoing technical field and background.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A system in an aircraft for identifying a flight plan modification that has a favorable impact from jet streams is provided. The system includes one or more processors configured by programming instructions on non-transient computer readable media. The system is configured to: retrieve an entered flight plan for the aircraft; retrieve available jet stream data identifying one or more jet streams in proximity to a proposed flight path from the entered flight plan, wherein the jet stream data includes jet stream vector, altitude, width, and thickness data; project the jet stream data around the proposed flight path as points of interest around the proposed flight path; identify a flight plan modification that has the most favorable impact from jet streams at the points of interest; and display the identified flight plan modification on a user interface.

A computer-implemented method in an aircraft for identifying a flight plan modification that has a favorable impact from jet streams is provided. The method includes: retrieving an entered flight plan for the aircraft; retrieving available jet stream data identifying one or more jet streams in proximity to a proposed flight path from the entered flight plan, wherein the jet stream data includes jet stream vector, altitude, width, and thickness data; projecting the jet stream data around the proposed flight path as points of interest around the proposed flight path; identifying a flight plan modification that has the most favorable impact from jet streams at the points of interest; and displaying the identified flight plan modification on a user interface.

Furthermore, other desirable features and characteristics will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

Figure 1:
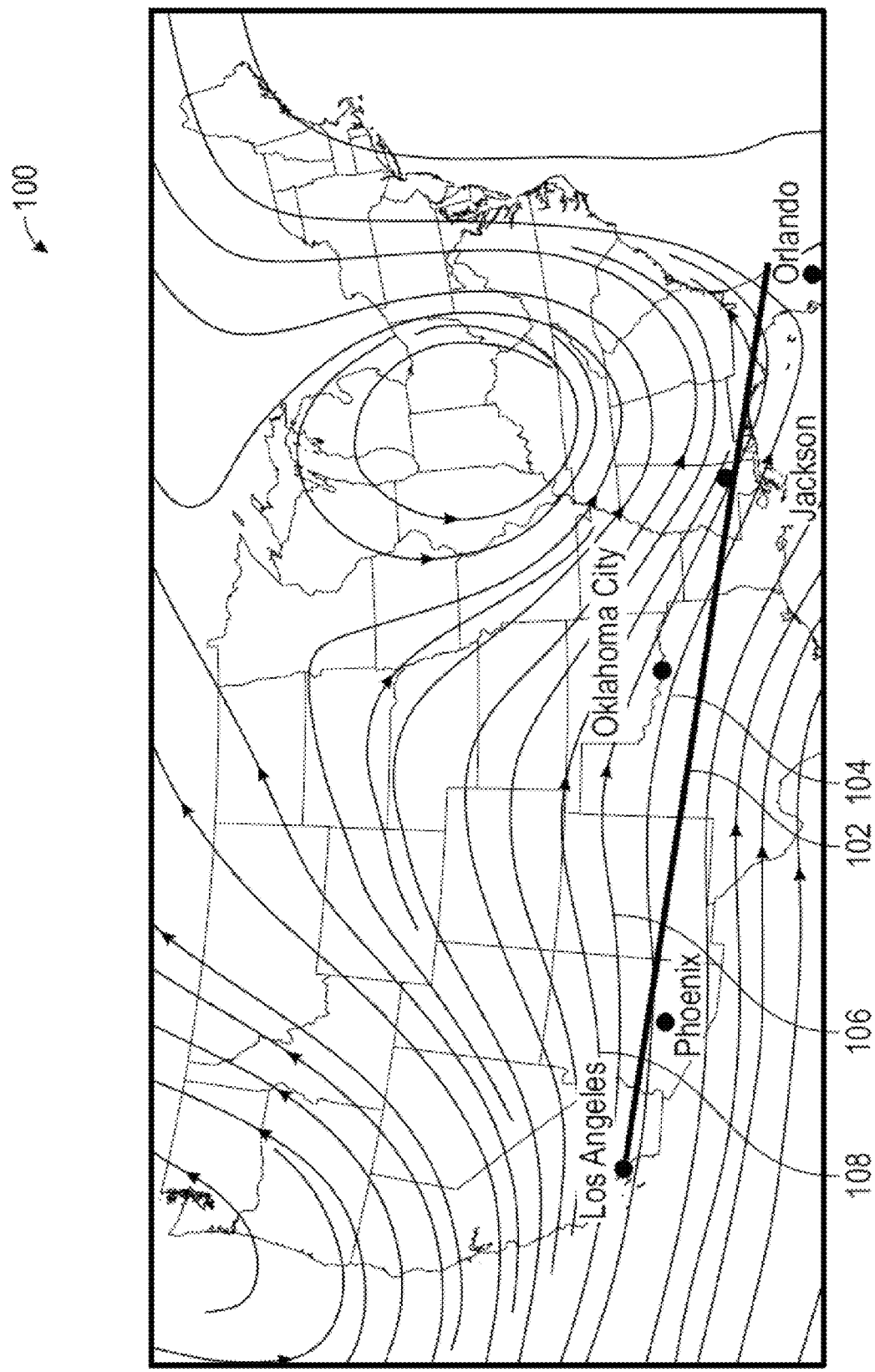
FIG. 1 is a diagram illustrating an example flight environment showing a number of jet streams over the continental U.S., in accordance with some embodiments.

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein are merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The subject matter described herein discloses apparatus, systems, techniques and articles for identifying favorable jet streams for an aircraft's entered flight plan and suggesting favorable flight levels that can advantageously use favorable jet streams to improve fuel economy and aircraft performance. The apparatus, systems, techniques and articles provided herein utilize the existence of jet streams with respect to a planned route as one factor for aircraft performance and/or for fuel efficiency computations.

Favorable jet streams can be a key factor in improving aircraft performance and fuel efficiency. Conversely, unfavorable jet streams can reduce aircraft performance and fuel efficiency. Additionally, unfavorable jet streams can impact aircraft safety. Adjusting flight levels to take advantage of favorable jet streams and/or to avoid unfavorable jet streams, therefore, can improve aircraft performance, improve aircraft fuel efficiency, and can help improve aircraft safety.

The subject matter described herein discloses apparatus, systems, techniques and articles for computing an aircraft cruise flight level through considering jet streams vector data for jet streams that intersect and/or are in close proximity to a planned aircraft flight path, an aircraft ceiling altitude, and engine data (e.g., from an aircraft engine database) for the aircraft.

FIG. 1 is a diagram illustrating an example flight environment 100 showing a number of jet streams over the continental U.S. The major jet streams on earth generally flow from west to east. Jet streams, however, can flow in different direction, meander north to south in a wave-shaped pattern, start, stop, split into two are more or combine into one as shown in FIG. 1. Jet streams can change position, location, and strength depending on the season. Jet stream winds may range in speed from 120 to 250 mph, but can reach more than 275 mph.

Aircraft fly relative to the air around them. In the case of a tail wind, the air around an aircraft is also moving, and the combination of the speed of the aircraft relative to the surrounding air and the speed of the air in which the aircraft is flying results in an aircraft ground speed that is greater than its air speed. A head wind, on the other hand, will reduce the ground speed of an aircraft. By flying in the direction of a jet stream vector, an aircraft can get carried along by a jet stream tail wind, saving the aircraft time and/or fuel.

Overlaid on the flight environment 100 is an example aircraft flight path 102 for flight from Los Angeles to Orlando. The example flight path 102 crosses three different jet streams (102, 106, 108).

A cruise level computation system is provided that can obtain the aircraft cruise heading and jet stream vector, altitude, width and thickness data for areas in close proximity to an aircraft flight path. Using the aircraft cruise heading and jet stream data, the cruise level computation system can estimate the effect jet streams in close proximity to an aircraft flight path can have on aircraft performance or fuel efficiency and calculate a cruise altitude that maximizes the beneficial effects of jet streams. The cruise level computation system can cause a recommended cruise level to be displayed to flight crew for review and approval and modify, upon flight crew authorization, a current flight plan with the cruise level recommended by the system and authorized for use by the flight crew.

The cruise level computation system can factor in the effect of a jet stream on aircraft ground speed and select a cruise level that allows the aircraft to adjust air speed and thus fuel consumption to reach its destination during a designated arrival time window. The cruise level computation system can select a cruise level that maximizes the amount of time that the aircraft flies within a favorable jet stream and/or minimizes the amount of time the aircraft flies within an unfavorable jet stream. The cruise level computation system may also select a cruise level that balances the amount of time that the aircraft flies within favorable and unfavorable jet streams to achieve the most beneficial effect.

The cruise level computation system can obtain jet stream vector, altitude, width and thickness data from historical data and/or through various advanced forecasting and sensing tools. For example, jet stream data can be stored on a cloud-based server and updated periodically. Registered users may directly access regional jet stream data from the cloud-based server and store it in a local jet stream database, e.g., onboard the aircraft. The cruise level computation system can access the locally stored jet stream data to compute an optimal cruise level that maximizes favorable effects of jet streams in close proximity to the aircraft's flight path.

Figure 2:
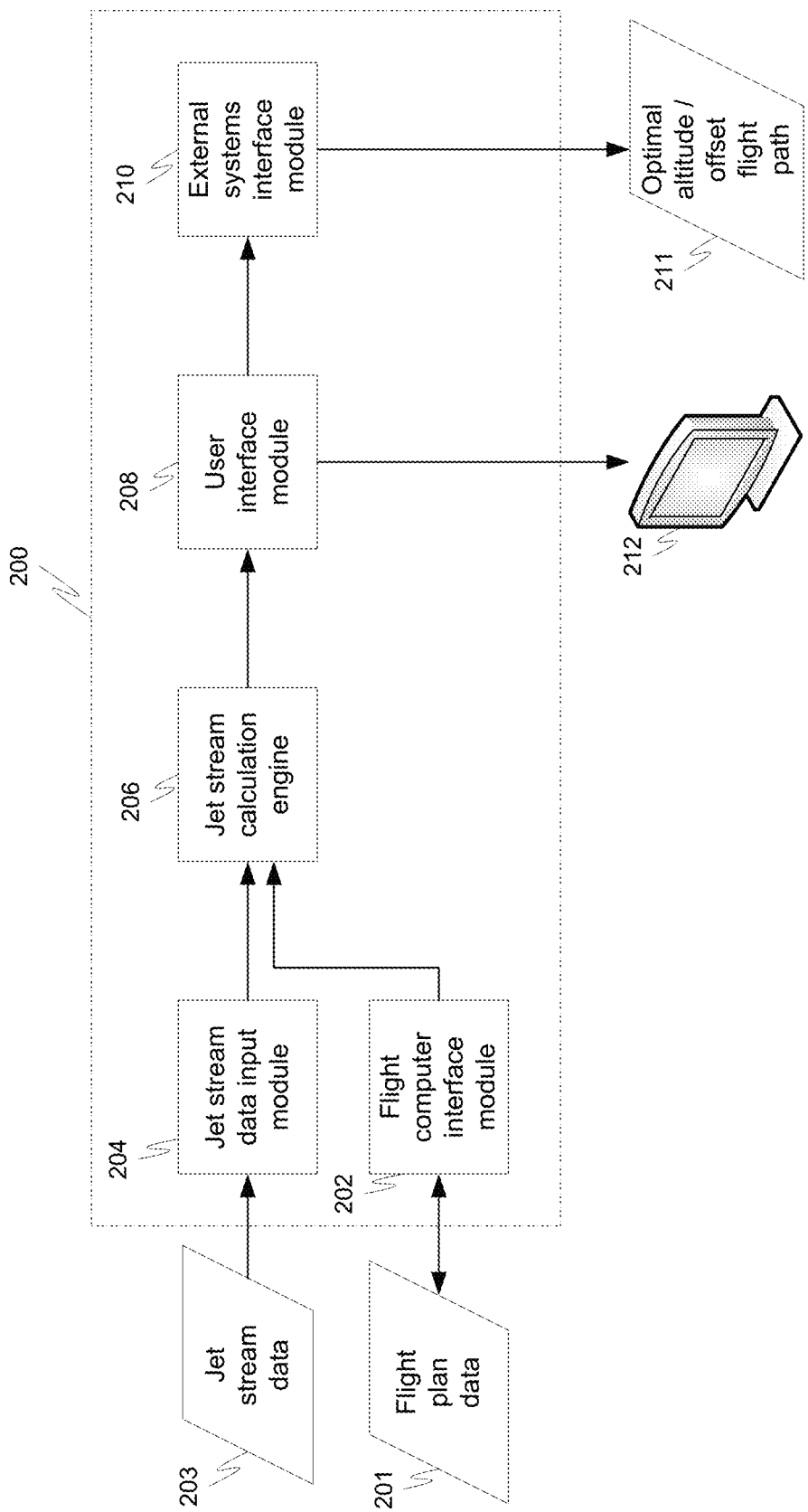
FIG. 2 is a block diagram depicting an example cruise level computation system, in accordance with some embodiments.

FIG. 2 is a block diagram depicting an example cruise level computation system 200. The example cruise level computation system 200 is configured to select a cruise level that maximizes the amount of time that an aircraft flies within a favorable jet stream, minimizes the amount of time the aircraft flies within an unfavorable jet stream, and/or select a cruise level that balances the amount of time the aircraft flies within favorable and unfavorable jet streams to achieve the most beneficial effect. The example system 200 comprises a flight computer interface module 202, jet stream data input module 204, jet stream calculation engine 206, a user interface module 208, and an external systems interface module 210.

The example cruise level computation system 200 includes a controller that is configured to implement the flight computer interface module 202, jet stream data input module 204, jet stream calculation engine 206, user interface module 208, and external systems interface module 210. The controller includes at least one processor and a computer-readable storage device or media encoded with programming instructions for configuring the controller. The processor may be any custom-made or commercially available processor, a central processing unit (CPU), a graphics processing unit (GPU), an application specific integrated circuit (ASIC), a field programmable gate array (FPGA), an auxiliary processor among several processors associated with the controller, a semiconductor-based microprocessor (in the form of a microchip or chip set), any combination thereof, or generally any device for executing instructions.

The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the controller.

The example flight computer interface module 202 is configured to exchange flight plan data 201 with a flight computer on the aircraft. In particular, the example flight computer interface module 202 is configured to (a) retrieve (e.g., from the flight computer on the aircraft) an entered flight plan 201 for the aircraft; and (b) provide (e.g., to the flight computer on the aircraft) an updated flight plan 201 with an updated cruise flight level and/or laterally offset flight path that optimizes beneficial effects of jet streams in close proximity to the flight path in the original flight plan. The example flight computer interface module 202 is further configured to cause the updated flight plan to be activated as the current flight plan after air traffic control (ATC) approval and flight crew acceptance of the updated flight plan through a user interface.

The example jet stream data input module 204 is configured to retrieve available jet stream data 203 identifying one or more jet streams in close proximity to the planned flight path from the aircraft's entered flight plan. The jet stream data 203 may include jet stream vector, altitude, width, and thickness data. The jet stream data 203 may be retrieved from a local or external database that contains historical jet stream data. The jet stream data 203 may be retrieved from various advanced forecasting and sensing tools. For example, jet stream data may be stored on a cloud-based server and updated periodically. Registered users may directly access regional jet stream data from the cloud-based server and store the jet stream data in a local jet stream database, e.g., onboard the aircraft. The example jet stream data input module 204 may access the locally stored jet stream data for use in computing an optimal cruise level that maximizes favorable effects of jet streams in close proximity to the aircraft's flight path.

The example jet stream calculation engine 206 is configured to use flight plan data 201 and jet stream data 203 to determine an updated cruise flight level and/or laterally offset flight path that optimizes beneficial effects of jet streams in close proximity to the flight path in the original flight plan. In one example, the example jet stream calculation engine 206 is configured to: (a) project the jet stream data around the proposed flight path as points of interest (e.g., ABEAM points) (vector and altitude) at equal distances (e.g., every 20 NM) along the proposed flight path; (b) for a plurality of altitudes, calculate for each point of interest (POI) whether the altitude will result in a favorable impact, an unfavorable impact, or no impact from jet streams at that point of interest and/or calculate for each point of interest the degree of favorability or unfavourability at that point of interest; and (c) identify a cruise flight level that has the most favorable impact from jet streams. Identifying a cruise flight level that has the most favorable impact from jet streams may involve selecting a cruise flight level that (i) has the maximum number of favorable POIs along the proposed flight path, or (ii) the highest degree of favorability. The cruise flight level with the highest degree of favorability may be the cruise level at which the sum of the degree of favorability for each POI at that cruise level is higher than the sum of the degree of favorability for each POI at other cruise levels. Identifying a cruise flight level that has the most favorable impact from jet streams may involve considering jet streams vector data, aircraft ceiling altitude, and aircraft engine performance data from an aircraft engine database. The example cruise flight level may provide a favorable POI when it is determined that aircraft performance, air speed, fuel efficiency, passenger comfort (e.g., turbulence) and/or safety (e.g., turbulence) is improved at that POI at the identified cruise flight level. In this example, the POIs are equidistant apart. In other example, the POIs may not be equidistant apart. The number of POIs or distances between POIs is configurable.

In another example, the example jet stream calculation engine 206 is additionally or alternatively configured to determine a laterally offset flight path that optimizes beneficial effects of jet streams in close proximity to the flight path in the original flight plan. The example jet stream calculation engine 206 is configured to: (a) project the jet stream data around the proposed flight path; (b) identify potential waypoints (e.g., every 50 NM) at equal distances along the path of a jet stream in close proximity to the entered flight path wherein the waypoints form a potential laterally offset flight path; (b) calculate the impact on aircraft performance of the jet stream for travel along the potential laterally offset flight path; and (c) select a potential offset flight path for presentation to the flight crew when aircraft performance and/or fuel consumption is improved by flight along the potential laterally offset flight path. When more than one potential laterally offset flight paths are available, the example jet stream calculation engine 206 is configured to identify the offset flight path that has the most favorable impact from jet streams.

Figure 3:
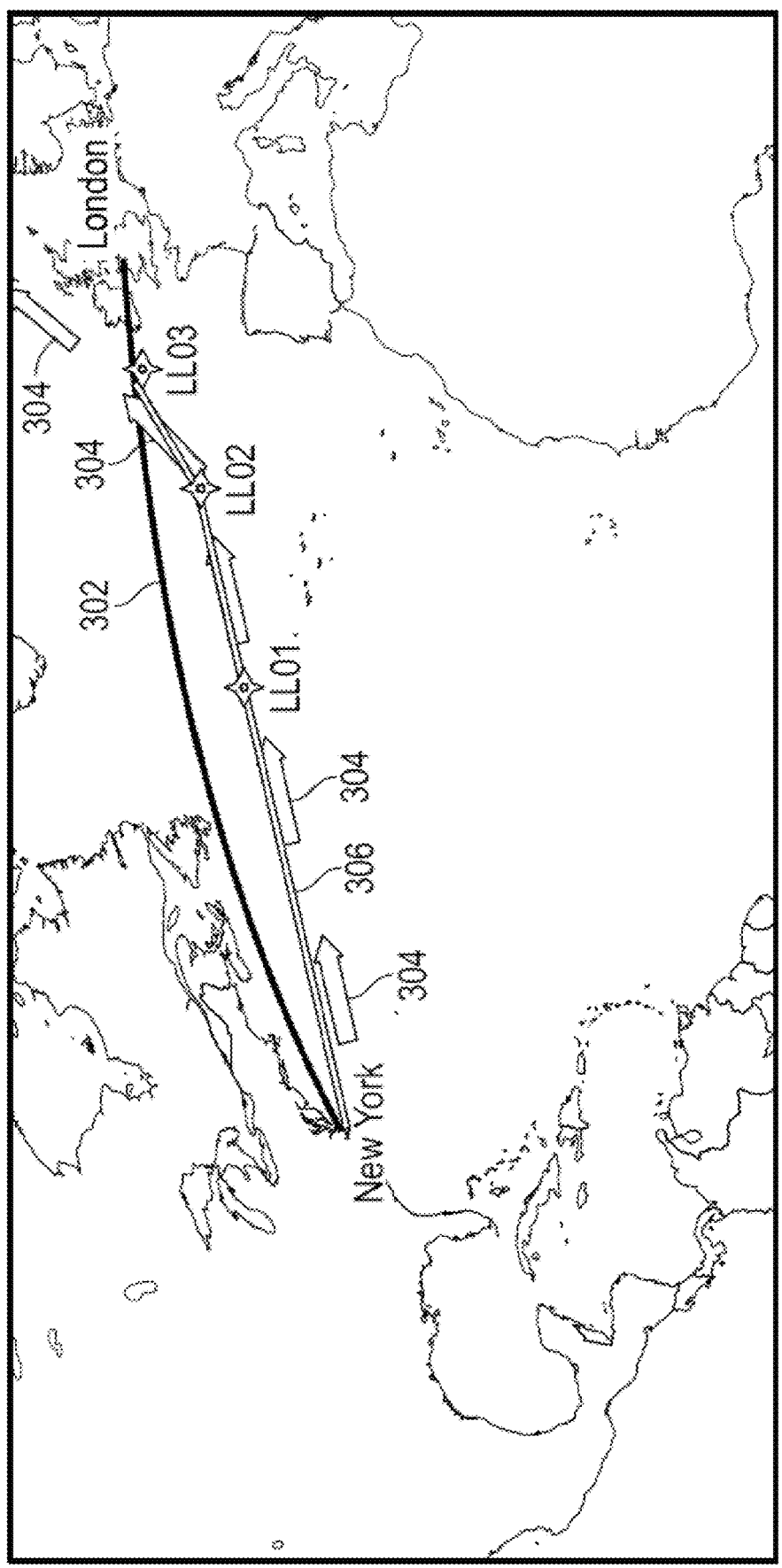
FIG. 3 is a diagram illustrating a lateral modification of a flight path to take advantage of favorable jet streams, in accordance with some embodiments.

FIG. 3 is a diagram illustrating a lateral modification of a flight path to take advantage of favorable jet streams. An example flight path 302 from New York to London from an entered flight plan is depicted. Also depicted is the path 304 of an example favorable jet stream. The flight plan may be modified by inserting waypoints LL01, LL02, and LL03 along the path 304 of the favorable jet stream. A modified flight path 306 that is laterally offset from the original flight path 302 can be constructed by connecting the starting point, New York, to waypoints LL01, LL02, and LL03 and ultimately to London. The example jet stream calculation engine 206 is configured to calculate the modified flight path 306, include the modified flight path 306 in a new flight plan, and submit the new flight plan to ATC for approval.

Referring back to FIG. 2, the example jet stream calculation engine 206 is further configured to create a modified flight plan by modifying the aircraft's entered flight plan with the identified cruise flight level and/or an offset flight path.

The example user interface module 208 is configured to cause the identified cruise flight level to be displayed on a user interface 212 as an optimum altitude for flight crew review and selection. The example user interface module 208 is also configured to cause a laterally offset flight path to be displayed on a user interface for flight crew review. The example user interface module 208 is further configured to cause a modified flight plan to be displayed for flight crew review and approval on the user interface.

Figure 4:
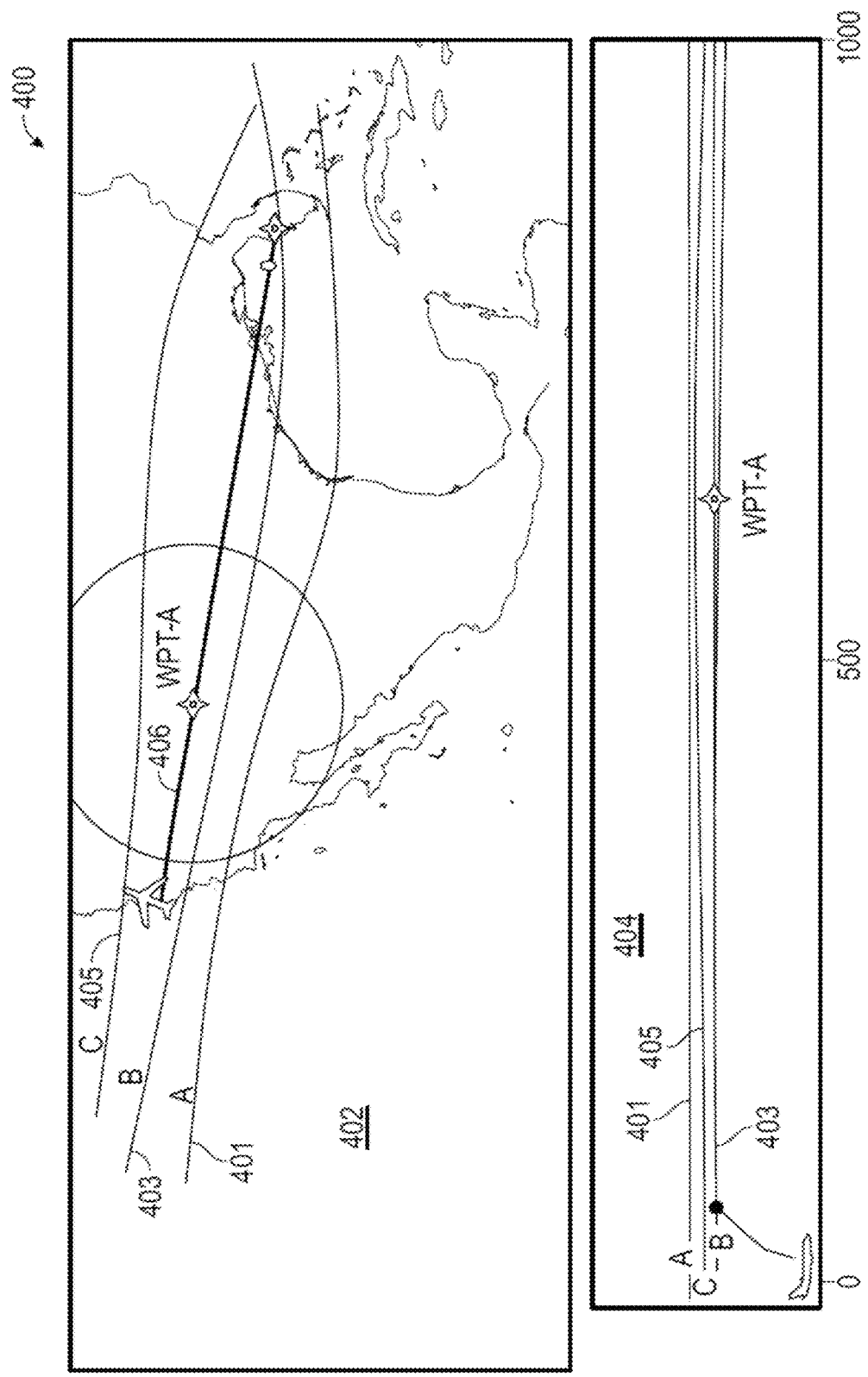
FIG. 4 is a diagram depicting an example navigational display with an example birds-eye view and an example vertical situation display view wherein jet stream data for jet streams in close proximity to an entered flight plan are illustrated, in accordance with some embodiments.

The example user interface module 208 is configured to cause the display of jet streams on a navigational display. FIG. 4 is a diagram depicting an example navigational display with an example birds-eye view 402 and an example vertical situation display view 404 wherein jet stream data for jet streams in close proximity to an entered flight plan are illustrated. In the example birds-eye view 402, example jet stream A (401), jet stream B (403), and jet stream C (405) are depicted. The example jet stream A (401), jet stream B (403), and jet stream C (405) are also depicted in the example vertical situation display view. Also depicted is the entered flight path 406. These depictions may be useful for a flight crew when selecting a jet stream of which the flight plan will take advantageous use.

Figure 5:
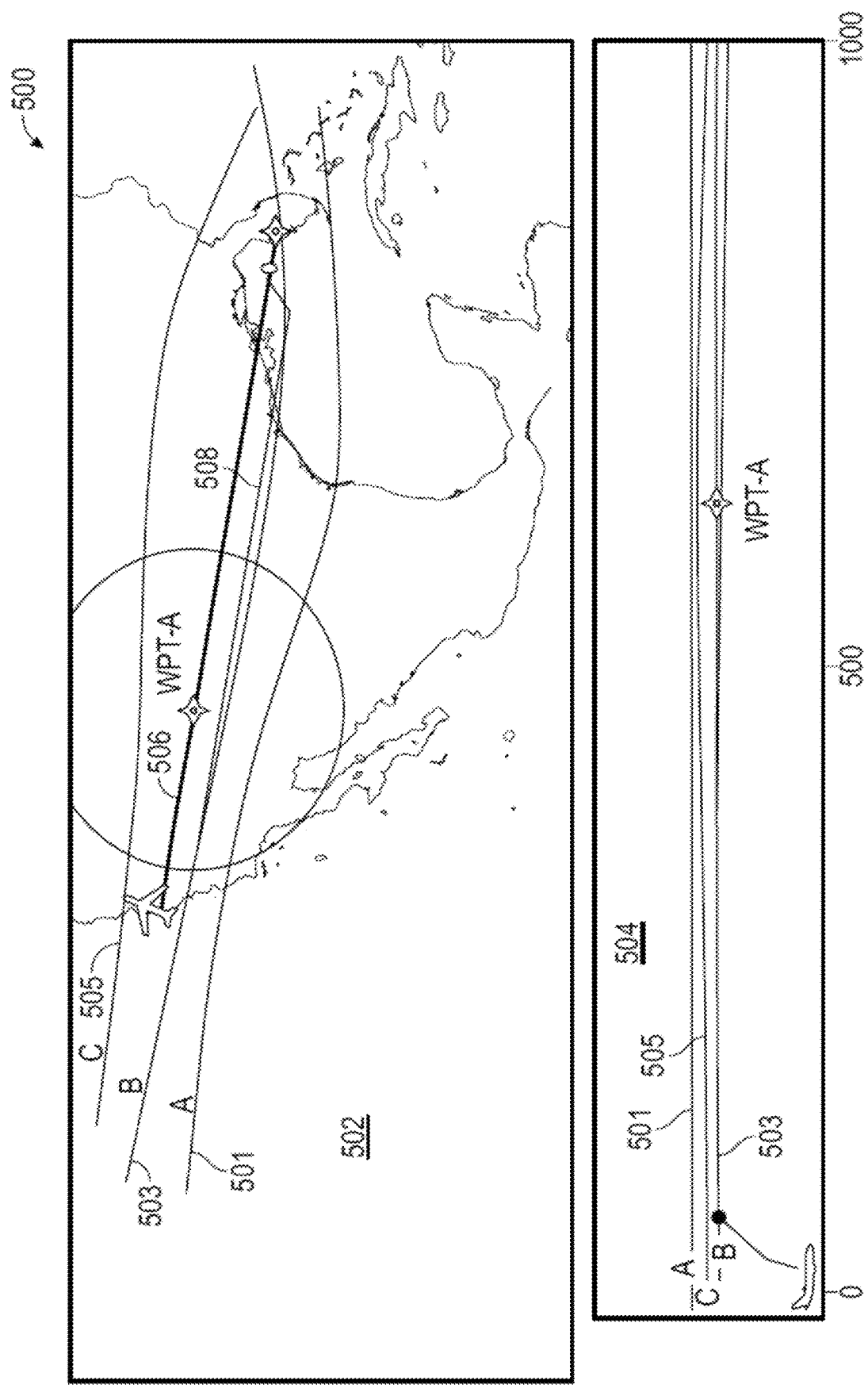
FIG. 5 is a diagram depicting another example navigational display with an example birds-eye display and an example vertical situation display wherein jet stream data for jet streams in close proximity to an entered flight plan are illustrated, in accordance with some embodiments.

FIG. 5 is a diagram depicting another example navigational display 500 with an example birds-eye display 502 and an example vertical situation display 504 wherein jet stream data for jet streams in close proximity to an entered flight plan are illustrated. In the example birds-eye view 502, example jet stream A (501), jet stream B (503), and jet stream C (505) are depicted. The example jet stream A (501), jet stream B (503), and jet stream C (505) are also depicted in the example vertical situation display view. Also depicted is the entered flight path 506 and a proposed laterally offset flight path 508. These depictions may be useful for a flight crew when selecting a jet stream of which to take advantageous use.

Referring back to FIG. 2, the example external systems interface module 210 is configured to communicate with ground systems, such as ATC, to request approval of flight plan changes (e.g., changes in flight level and/or offset flight path). The example external systems interface module 210 is configured to submit the modified flight plan to ATC for approval.

The example external systems interface module 210 is further configured to transmit a message 211 that includes the identified cruise flight level, offset flight path, and/or the modified flight plan for receipt and use by other aircraft for flight along a similar flight path. Additionally, the example external systems interface module 210 is configured to store on a cloud server a message 211 that includes the identified cruise flight level, offset flight path, and/or the modified flight plan for use by other aircraft for flight along a similar flight path.

Figure 6:
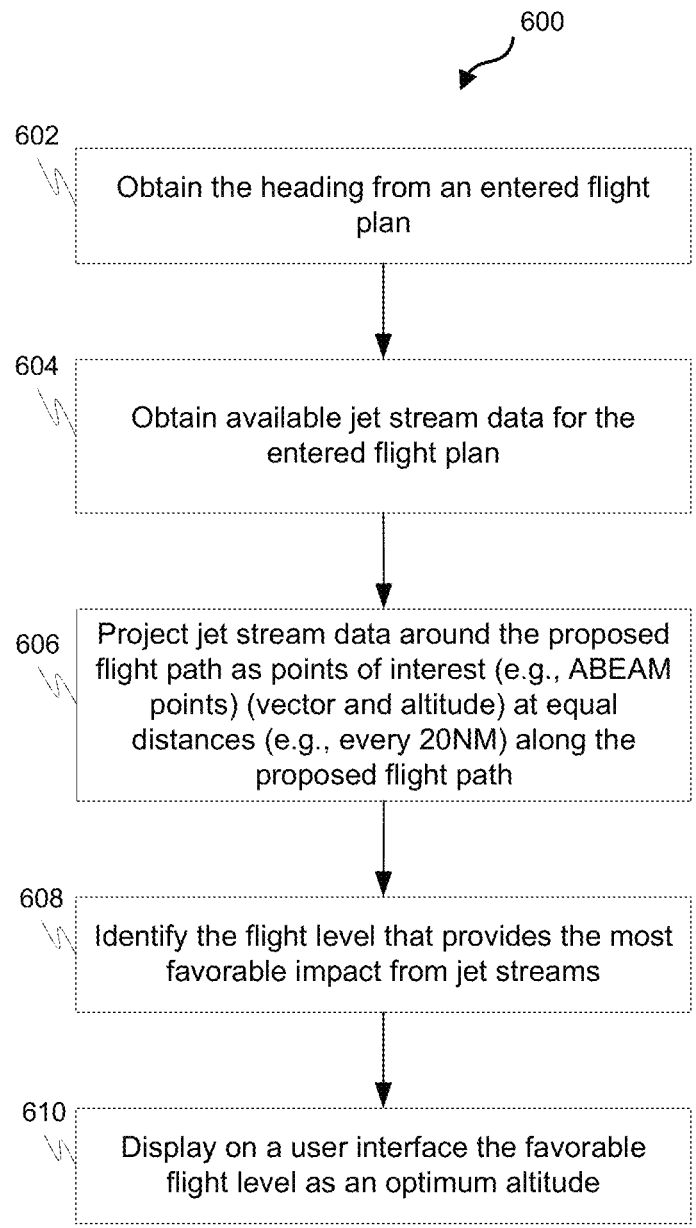
FIG. 6 is a process flow chart depicting an example process for selecting a cruise level that maximizes the amount of time that an aircraft flies within a favorable jet stream, in accordance with some embodiments.

FIG. 6 is a process flow chart depicting an example process for selecting a cruise level that maximizes the amount of time that an aircraft flies within a favorable jet stream. The order of operation within the process 600 is not limited to the sequential execution as illustrated in the figure, but may be performed in one or more varying orders as applicable and in accordance with the present disclosure.

The example process 600 includes obtaining the heading from an entered flight plan (operation 602). This may involve retrieving from the flight computer on the aircraft an entered flight plan for the aircraft.

The example process 600 also includes obtaining available jet stream data for the entered flight plan (operation 604). This may involve identifying one or more jet streams in close proximity to the planned flight path from the aircraft's entered flight plan. The jet stream data may include jet stream vector, altitude, width, and thickness data. The jet stream data may be retrieved from a local or external database that contains historical jet stream data. The jet stream data may be retrieved from various advanced forecasting and sensing tools. For example, jet stream data may be stored on a cloud-based server and updated periodically. Registered users may directly access regional jet stream data from the cloud-based server and store the jet stream data in a local jet stream database, e.g., onboard the aircraft.

The example process 600 includes projecting jet stream data around the proposed flight path as points of interest (e.g., ABEAM points) (vector and altitude) at equal distances (e.g., every 20 NM) along the proposed flight path (operation 606).

The example process 600 includes identifying the flight level that provides the most favorable impact from jet streams (operation 608). This may involve: (a) for a plurality of altitudes, calculating for each point of interest (POI) whether the altitude will result in a favorable impact, an unfavorable impact, or no impact from jet streams at that point of interest and/or calculating for each point of interest the degree of favorability or unfavourability at that point of interest; and (b) identifying a cruise flight level that has the most favorable impact from jet streams. Identifying a cruise flight level that has the most favorable impact from jet streams may involve selecting a cruise flight level that (i) has the maximum number of favorable POIs along the proposed flight path, or (ii) the highest degree of favorability. The cruise flight level with the highest degree of favorability may be the cruise level at which the sum of the degree of favorability for each POI at that cruise level is higher than the sum of the degree of favorability for each POI at other cruise levels. Identifying a cruise flight level that has the most favorable impact from jet streams may involve considering jet streams vector data, aircraft ceiling altitude, and aircraft engine performance data from an aircraft engine database. The example cruise flight level may provide a favorable POI when it is determined that aircraft performance, air speed, fuel efficiency, passenger comfort (e.g., turbulence) and/or safety (e.g., turbulence) is improved at that POI at the identified cruise flight level. In this example, the POIs are equidistant apart. In other example, the POIs may not be equidistant apart. The number of POIs or distances between POIs is configurable.

The example process 600 further includes displaying on a user interface the favorable flight level as an optimum altitude (operation 610).

Figure 7:
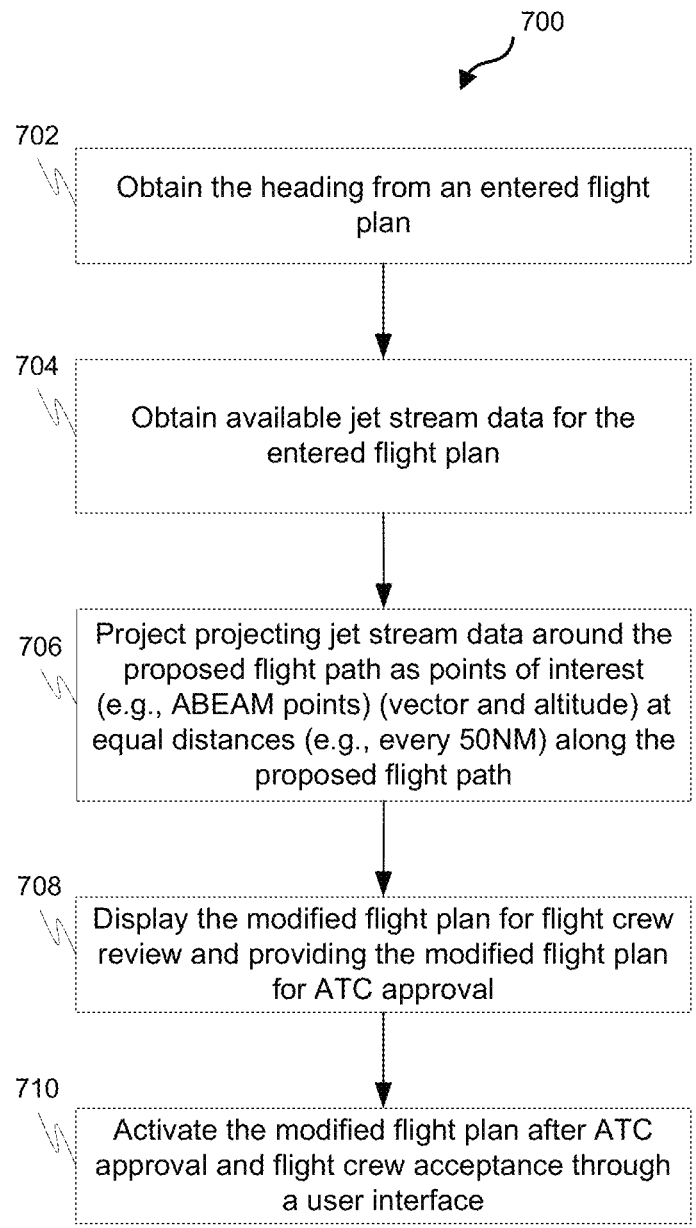
FIG. 7 is a process flow chart depicting an example process for selecting a modified flight path and cruise level that maximizes the amount of time that an aircraft flies within a favorable jet stream, in accordance with some embodiments.

FIG. 7 is a process flow chart depicting an example process for selecting a modified flight path and cruise level that maximizes the amount of time that an aircraft flies within a favorable jet stream. The order of operation within the process 700 is not limited to the sequential execution as illustrated in the figure, but may be performed in one or more varying orders as applicable and in accordance with the present disclosure.

The example process 700 includes obtaining the heading from an entered flight plan (operation 702). This may involve retrieving from the flight computer on the aircraft an entered flight plan for the aircraft.

The example process 700 also includes obtaining available jet stream data for the entered flight plan (operation 704). This may involve identifying one or more jet streams in close proximity to the planned flight path from the aircraft's entered flight plan. The jet stream data may include jet stream vector, altitude, width, and thickness data. The jet stream data may be retrieved from a local or external database that contains historical jet stream data. The jet stream data may be retrieved from various advanced forecasting and sensing tools. For example, jet stream data may be stored on a cloud-based server and updated periodically. Registered users may directly access regional jet stream data from the cloud-based server and store the jet stream data in a local jet stream database, e.g., onboard the aircraft.

The example process 700 includes projecting jet stream data around the proposed flight path as points of interest (e.g., ABEAM points) (vector and altitude) at equal distances (e.g., every 50 NM) along the proposed flight path (operation 706). This may involve selecting waypoints for a new flight plan that follow a jet stream and that are laterally offset from the current flight plan. The new flight path may be provided for consideration by the flight crew if the benefits from the new flight plan (e.g., speed, time to destination, reduced fuel) outweighs an increased flight path length from the lateral offset.

The example process 700 includes displaying the modified flight plan for flight crew review and providing the modified flight plan for ATC approval (operation 708). The example process 700 further includes activating the modified flight plan after ATC approval and flight crew acceptance through a user interface (operation 710).

Figure 8:
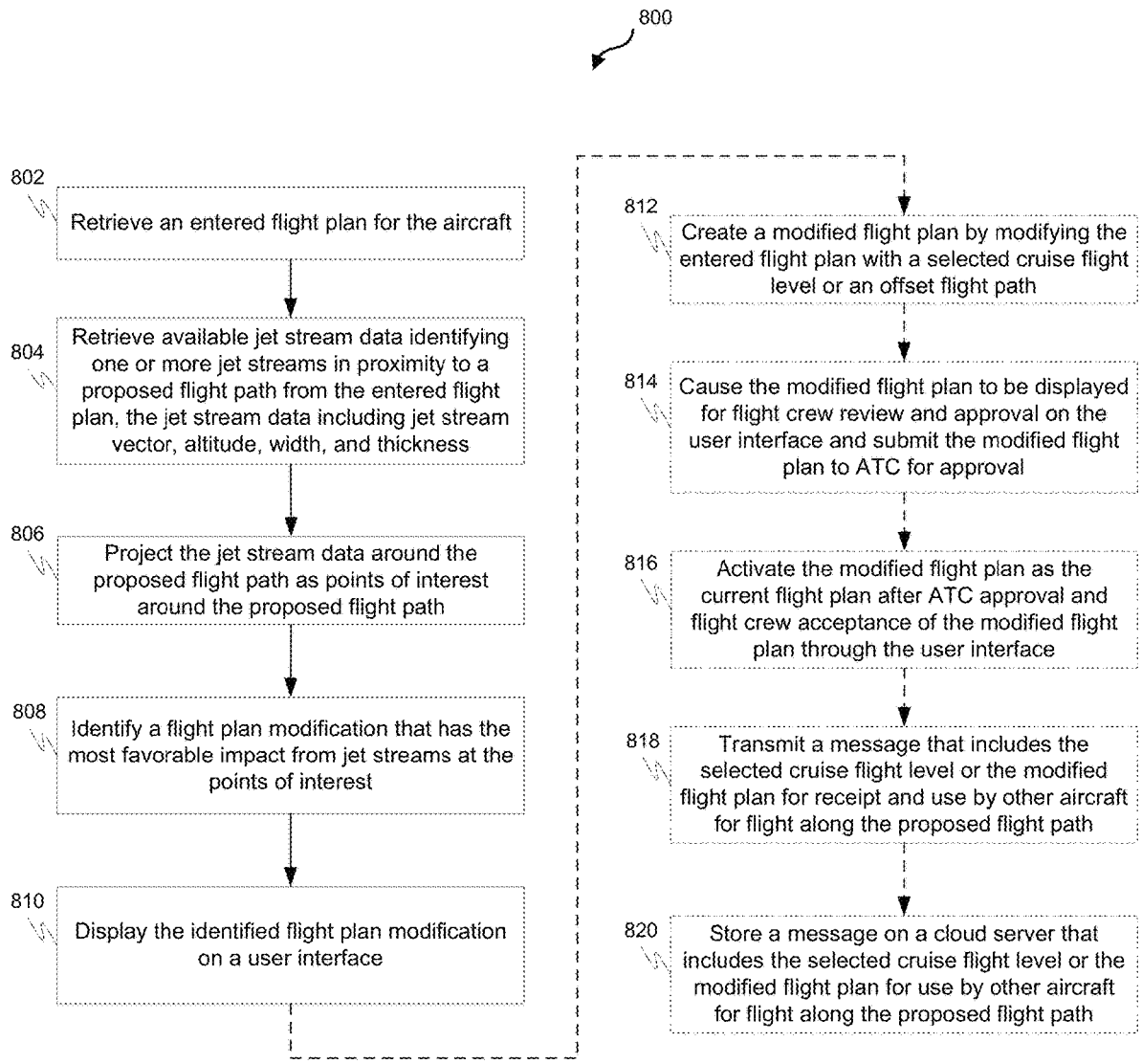
FIG. 8 is a process flow chart depicting an example computer-implemented process in an aircraft for identifying a flight plan modification that has a favorable impact from jet streams, in accordance with some embodiments.

FIG. 8 is a process flow chart depicting an example computer-implemented process 800 in an aircraft for identifying a flight plan modification that has a favorable impact from jet streams. The order of operation within the process 800 is not limited to the sequential execution as illustrated in the figure, but may be performed in one or more varying orders as applicable and in accordance with the present disclosure.

The example process 800 includes retrieving an entered flight plan for the aircraft (operation 802); retrieving available jet stream data identifying one or more jet streams in proximity to a proposed flight path from the entered flight plan, wherein the jet stream data includes jet stream vector, altitude, width, and thickness data (operation 804); and projecting the jet stream data around the proposed flight path as points of interest around the proposed flight path (operation 806).

The example process 800 includes identifying a flight plan modification that has the most favorable impact from jet streams at the points of interest (operation 808). The flight plan modification may be a cruise flight level that has the most favorable impact from jet streams at the points of interest. The flight plan modification may be an offset flight path for the entered flight plan that takes advantage of a favorable jet stream. The favorable impact may comprise an improvement in one or more of aircraft performance, fuel efficiency, air speed, passenger comfort, and/or safety. Identifying a flight plan modification may comprise identifying a cruise level that provides a maximum number of favorable points of interest along the proposed flight path. Identifying a cruise flight level may include computing the cruise flight level considering jet streams vector data, aircraft ceiling altitude, and data from an aircraft engine database.

The example process 800 includes displaying the identified flight plan modification on a user interface (operation 810). Displaying the identified flight plan modification on a user interface may comprise displaying the identified cruise flight level on a user interface as an optimum altitude for flight crew review and selection.

The example process 800 may further include creating a modified flight plan by modifying the entered flight plan with a selected cruise flight level that has the most favorable impact from jet streams at the points of interest or modifying the entered flight plan with an offset flight path that takes advantage of a favorable jet stream (operation 812).

The example process 800 may further include causing the modified flight plan to be displayed for flight crew review and approval on the user interface and submitting the modified flight plan to ATC for approval (operation 814).

The example process 800 may further include activating the modified flight plan as the current flight plan after ATC approval and flight crew acceptance of the modified flight plan through the user interface (operation 816).

The example process 800 may further include transmitting a message that includes the selected cruise flight level or the modified flight plan for receipt and use by other aircraft for flight along the proposed flight path (operation 818).

The example process 800 may further include storing a message on a cloud server that includes the selected cruise flight level or the modified flight plan for use by other aircraft for flight along the proposed flight path (operation 820).

Described herein are apparatus, systems, techniques and articles for identifying favorable jet streams for an aircraft's entered flight plan and suggesting favorable flight levels and/or flight path offsets that can advantageously use favorable jet streams to improve fuel economy and aircraft performance. In one embodiment, a system in an aircraft for identifying a flight plan modification that has a favorable impact from jet streams is provided. The system comprises one or more processors configured by programming instructions on non-transient computer readable media. The system is configured to: retrieve an entered flight plan for the aircraft; retrieve available jet stream data identifying one or more jet streams in proximity to a proposed flight path from the entered flight plan, wherein the jet stream data includes jet stream vector, altitude, width, and thickness data; project the jet stream data around the proposed flight path as points of interest around the proposed flight path; identify a flight plan modification that has the most favorable impact from jet streams at the points of interest; and display the identified flight plan modification on a user interface.

In one embodiment, the flight plan modification comprises a cruise flight level that has the most favorable impact from jet streams at the points of interest.

In one embodiment, the favorable impact comprises an improvement in one or more of aircraft performance, fuel efficiency, air speed, passenger comfort, and/or safety In one embodiment, to identify a flight plan modification the system is configured to identify a cruise level that provides a maximum number of favorable points of interest along the proposed flight path.

In one embodiment, to identify a cruise flight level the system is configured to compute the cruise flight level considering jet streams vector data, aircraft ceiling altitude, and data from an aircraft engine database.

In one embodiment, to display the identified flight plan modification on a user interface the system is configured to display the identified cruise flight level on a user interface as an optimum altitude for flight crew review and selection.

In one embodiment, to identify a flight plan modification the system is configured to identify an offset flight path for the entered flight plan that takes advantage of a favorable jet stream.

In one embodiment, the system is further configured to create a modified flight plan by modifying the entered flight plan with a selected cruise flight level that has the most favorable impact from jet streams at the points of interest or modify the entered flight plan with an offset flight path that takes advantage of a favorable jet stream.

In one embodiment, the system is further configured to: cause the modified flight plan to be displayed for flight crew review and approval on the user interface; and submit the modified flight plan to ATC for approval.

In one embodiment, the system is further configured to activate the modified flight plan as the current flight plan after ATC approval and flight crew acceptance of the modified flight plan through the user interface.

In one embodiment, the system is further configured to transmit a message that includes the selected cruise flight level or the modified flight plan for receipt and use by other aircraft for flight along the proposed flight path In one embodiment, the system is further configured to store a message on a cloud server that includes the selected cruise flight level or the modified flight plan for use by other aircraft for flight along the proposed flight path.

In another embodiment, a computer-implemented method in an aircraft for identifying a flight plan modification that has a favorable impact from jet streams is provided.

The method comprises: retrieving an entered flight plan for the aircraft; retrieving available jet stream data identifying one or more jet streams in proximity to a proposed flight path from the entered flight plan, wherein the jet stream data includes jet stream vector, altitude, width, and thickness data; projecting the jet stream data around the proposed flight path as points of interest around the proposed flight path; identifying a flight plan modification that has the most favorable impact from jet streams at the points of interest; and displaying the identified flight plan modification on a user interface.

In one embodiment, the flight plan modification comprises a cruise flight level that has the most favorable impact from jet streams at the points of interest.

In one embodiment, the favorable impact comprises an improvement in one or more of aircraft performance, fuel efficiency, air speed, passenger comfort, and/or safety.

In one embodiment, the identifying a flight plan modification comprises identifying a cruise level that provides a maximum number of favorable points of interest along the proposed flight path.

In one embodiment, identifying a cruise flight level includes computing the cruise flight level considering jet streams vector data, aircraft ceiling altitude, and data from an aircraft engine database.

In one embodiment, displaying the identified flight plan modification on a user interface comprises displaying the identified cruise flight level on a user interface as an optimum altitude for flight crew review and selection.

In one embodiment, identifying a flight plan modification comprises identifying an offset flight path for the entered flight plan that takes advantage of a favorable jet stream.

In one embodiment, the method further comprises creating a modified flight plan by modifying the entered flight plan with a selected cruise flight level that has the most favorable impact from jet streams at the points of interest or modifying the entered flight plan with an offset flight path that takes advantage of a favorable jet stream.

In one embodiment, the method further comprises causing the modified flight plan to be displayed for flight crew review and approval on the user interface; and submitting the modified flight plan to ATC for approval.

In one embodiment, the method further comprises activating the modified flight plan as the current flight plan after ATC approval and flight crew acceptance of the modified flight plan through the user interface.

In one embodiment, the method further comprises transmitting a message that includes the selected cruise flight level or the modified flight plan for receipt and use by other aircraft for flight along the proposed flight path.

In one embodiment, the method further comprises storing a message on a cloud server that includes the selected cruise flight level or the modified flight plan for use by other aircraft for flight along the proposed flight path.

In another embodiment, non-transient computer readable media encoded with programming instructions configurable to cause one or more processors in an aircraft to perform a method is provided. The method comprises: retrieving an entered flight plan for the aircraft; retrieving available jet stream data identifying one or more jet streams in proximity to a proposed flight path from the entered flight plan, wherein the jet stream data includes jet stream vector, altitude, width, and thickness data; projecting the jet stream data around the proposed flight path as points of interest around the proposed flight path; identifying a flight plan modification that has the most favorable impact from jet streams at the points of interest; and displaying the identified flight plan modification on a user interface.

In another embodiment, a system in an aircraft for computing an optimum cruise level by considering atmospheric conditions is provided. The system comprises one or more processors configured by programming instructions on non-transient computer readable media. The system is configured to: retrieve a heading from an entered flight plan; retrieve available jet stream data identifying jet streams that will impact a proposed flight path for the entered flight plan, wherein the jet stream data includes jet stream vector, altitude, width, and thickness data; project the jet stream data over the proposed flight path as ABEAM points at equidistant points along the proposed flight path; and identify a cruise flight level that provides a maximum number of favorable ABEAM points along the proposed flight path, wherein identifying a cruise flight level includes computing the cruise flight level considering jet streams vector data, aircraft ceiling altitude, and data from an aircraft engine database, and wherein identifying a cruise flight level includes determining that a cruise flight level provides a favorable ABEAM point when it is determined that aircraft performance, fuel efficiency, and/or safety is improved by flight along the proposed flight path at the identified cruise flight level. The system is further configured to: display the identified cruise flight level on a user interface as an optimum altitude for flight crew review; create a modified flight plan by modifying the entered flight plan with the identified cruise flight level; transmit a message that includes the identified cruise flight level and the proposed flight path for receipt and use by other aircraft for flight along the proposed flight path; store on a cloud server a message that includes the identified cruise flight level and the proposed flight path for use by other aircraft for flight along the proposed flight path; identify an offset flight path for the entered flight plan that takes advantage of a favorable jet stream; create a modified flight plan by modifying the entered flight plan with the offset flight path; display the modified flight plan for flight crew review and approval on the user interface and submit the modified flight plan to ATC for approval; and activate the modified flight plan as the current flight plan after ATC approval and flight crew acceptance of the modified flight plan through the user interface.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system in an aircraft for identifying a flight plan modification that has a favorable impact from jet streams, the system comprising one or more processors configured by programming instructions on non-transitory computer readable media, the system configured to:
retrieve an entered flight plan for the aircraft;
retrieve jet stream vector, altitude, width and thickness data for areas in close proximity to a proposed flight path from the entered flight plan;
project the jet stream vector, altitude, width and thickness data around the proposed flight path as a plurality of points of interest (POIs) around the proposed flight path;
calculate for each of a plurality of altitudes for each point of interest (POI) based on the jet stream vector, altitude, width and thickness data whether the altitude will result in a favorable impact, an unfavorable impact, or no impact from jet streams at that POI and/or the degree of favorability or unfavourability at that POI;
identify as a cruise flight level modification, based on the calculations, the altitude that has the highest number of favorable POIs along the proposed flight path or the highest degree of favorability at the points of interest; and
display the identified cruise level modification on a user interface.

2. The system of claim 1, wherein the plurality of POIs around the proposed flight path are spaced at equal distances.

3. The system of claim 1, wherein the favorable impact comprises an improvement in one or more of aircraft performance, fuel efficiency, air speed, passenger comfort, and/or safety.

4. The system of claim 1, wherein the cruise flight level with the highest degree of favorability is the cruise level at which the sum of the degree of favorability for each POI at that cruise level is higher than the sum of the degree of favorability for each POI at other cruise levels.

5. The system of claim 1, further configured to determine a laterally offset flight path that optimizes beneficial effects of jet streams in close proximity to the flight path in the entered flight plan.

6. The system of claim 1, wherein to display the identified cruise flight level modification on a user interface the system is configured to display the identified cruise flight level on a user interface as an optimum altitude for flight crew review and selection.

7. The system of claim 1, further configured to create a modified flight plan by modifying the entered flight plan with the identified cruise flight level.

8. The system of claim 5, wherein to determine a laterally offset flight path that optimizes beneficial effects of jet streams in close proximity to the flight path in the entered flight plan the system is further configured to:
project the jet stream data around the proposed flight path;
identify a plurality of potential waypoints at equal distances along the path of a jet stream in close proximity to the entered flight path wherein the waypoints form a potential laterally offset flight path;
calculate the impact on aircraft performance of the jet stream for travel along the potential laterally offset flight path; and
select the potential laterally offset flight path for presentation to the flight crew when aircraft performance and/or fuel consumption is improved by flight along the potential laterally offset flight path.

9. The system of claim 7, further configured to:
cause the modified flight plan to be displayed for flight crew review and approval on the user interface; and
submit the modified flight plan to ATC for approval.

10. The system of claim 9, further configured to activate the modified flight plan as the current flight plan after ATC approval and flight crew acceptance of the modified flight plan through the user interface.

11. The system of claim 9, further configured to transmit a message that includes the selected cruise flight level or the modified flight plan for receipt and use by other aircraft for flight along the proposed flight path.

12. The system of claim 9, further configured to store a message on a cloud server that includes the selected cruise flight level or the modified flight plan for use by other aircraft for flight along the proposed flight path.

13. A computer-implemented method in an aircraft for identifying a flight plan modification that has a favorable impact from jet streams, the method comprising:
retrieving an entered flight plan for the aircraft;
retrieving available jet stream vector, altitude, width and thickness data for areas in close proximity to a proposed flight path from the entered flight plan;
projecting the jet stream vector, altitude, width and thickness data around the proposed flight path as a plurality of points of interest (POIs) around the proposed flight path;
calculating for each of a plurality of altitudes for each point of interest (POI) based on the jet stream vector, altitude, width and thickness data whether the altitude will result in a favorable impact, an unfavorable impact, or no impact from jet streams at that POI and/or the degree of favorability or unfavourability at that POI;
identifying as a cruise flight level modification, based on the calculations, the altitude that has the highest number of favorable POIs along the proposed flight path or the highest degree of favorability at the points of interest; and
displaying the identified cruise level modification on a user interface.

14. The method of claim 13, wherein the plurality of POIs around the proposed flight path are spaced at equal distances.

15. The method of claim 13, wherein the favorable impact comprises an improvement in one or more of aircraft performance, fuel efficiency, air speed, passenger comfort, and/or safety.

16. The method of claim 13, wherein the cruise flight level with the highest degree of favorability is the cruise level at which the sum of the degree of favorability for each POI at that cruise level is higher than the sum of the degree of favorability for each POI at other cruise levels.

17. The method of claim 13, further comprising determining a laterally offset flight path that optimizes beneficial effects of jet streams in close proximity to the flight path in the entered flight plan.

18. The method of claim 17, wherein determining a laterally offset flight path that optimizes beneficial effects of jet streams in close proximity to the flight path in the entered flight plan comprises;
projecting the jet stream data around the proposed flight path;
identifying a plurality of potential waypoints at equal distances along the path of a jet stream in close proximity to the entered flight path wherein the waypoints form a potential laterally offset flight path;
calculating the impact on aircraft performance of the jet stream for travel along the potential laterally offset flight path; and
selecting the potential laterally offset flight path for presentation to the flight crew when aircraft performance and/or fuel consumption is improved by flight along the potential laterally offset flight path.

19. The method of claim 13, further comprising creating a modified flight plan by modifying the entered flight plan with the identified cruise flight level.

20. Non-transitory computer readable media encoded with programming instructions configurable to cause one or more processors in an aircraft to perform a method, the method comprising:
retrieving an entered flight plan for the aircraft;
retrieving available jet stream vector, altitude, width and thickness data for areas in close proximity to a proposed flight path from the entered flight plan;
projecting the jet stream vector, altitude, width and thickness data around the proposed flight path as a plurality of points of interest (POIs) around the proposed flight path;
calculating for each of a plurality of altitudes for each point of interest (POI) based on the jet stream vector, altitude, width and thickness data whether the altitude will result in a favorable impact, an unfavorable impact, or no impact from jet streams at that POI and/or the degree of favorability or unfavourability at that POI;
identifying as a cruise flight level modification, based on the calculations, the altitude that has the highest number of favorable POIs along the proposed flight path or the highest degree of favorability at the points of interest; and
displaying the identified cruise level modification on a user interface.

* * * * *